United States Patent [19]

Hereford

[11] Patent Number: 5,231,752
[45] Date of Patent: Aug. 3, 1993

[54] WIRE ROPE TERMINATION

[76] Inventor: J. A. Hereford, Rte. 2 Box 3144A, Nacogdoches, Tex. 75961

[21] Appl. No.: 845,314

[22] Filed: Mar. 3, 1992

[51] Int. Cl.$^5$ ............................................. B23P 11/02
[52] U.S. Cl. .................................. 29/461; 24/122.6; 29/517; 403/275; 403/284
[58] Field of Search ................... 29/517, 461; 403/275, 403/212, 284, 285; 24/122.6

[56] References Cited

U.S. PATENT DOCUMENTS

| | | | |
|---|---|---|---|
| 2,247,041 | 6/1941 | Bergan | 29/461 X |
| 3,468,569 | 9/1969 | Ballard et al. | 287/82 |
| 3,551,959 | 1/1971 | Mastalski | 24/123 |
| 3,551,960 | 1/1971 | Little | 24/123 |
| 3,742,561 | 7/1973 | Wensing | 24/123 |
| 3,844,665 | 10/1974 | Smith et al. | 403/267 |
| 3,909,886 | 10/1975 | Hocke | 24/122.6 |
| 3,989,400 | 11/1976 | Smith et al. | 29/517 X |
| 4,043,690 | 8/1977 | Browne | 403/268 |
| 4,183,692 | 1/1980 | Durr | 403/275 |
| 4,189,620 | 2/1980 | Strange | 174/79 |
| 4,215,463 | 8/1980 | Crook | 29/461 |
| 4,279,531 | 7/1981 | McKenzie | 403/275 X |
| 4,295,250 | 10/1981 | Dupuy | 24/122.6 |
| 4,507,008 | 3/1985 | Adl et al. | 403/275 |
| 4,511,280 | 4/1985 | Saint-Prix et al. | 403/274 |
| 4,645,867 | 2/1987 | Annas | 174/79 |

Primary Examiner—Joseph M. Gorski
Attorney, Agent, or Firm—Marvin J. Marnock

[57] ABSTRACT

A method of terminating wire ropes by swaging in the field with hand tools. At the factory, one end of termination (9) has been prepared with threads (13) and the opposing end has been drilled forming a hole the diameter of which is too small to fit a wire rope end (11) with a tapered locking plug (10) installed. At the factory the remaining metal is then swaged outward, forming the swaged out sleeve portion (12), to an inside diameter sufficient to allow insertion of wire rope end (11) with plug (10) installed. Out in the field, plug (10) is first inserted into wire rope end (11) over the center strand and under the outer strands. Assembled wire rope end (11) and plug (10) are now inserted into swaged out sleeve portion (12). Swaged out sleeve portion (12), with wire rope end (11) and plug (10) installed, is then swaged inward, with a hand tool, forming the inside walls into a taper that is coextensive with the plug's tapered portion (18). Wire rope end (11) is under compression between the inner wall of swaged in sleeve portion (21) and plug (10). Under tension loads, the wire rope strands grip plug (10) sufficiently to shift plug (10) axially inside swaged in sleeve portion (21) so that plug (10) compresses wire rope end (11) ever more tightly against swaged in sleeve portion (21) effectively locking wire rope end (11) and termination (9) together.

1 Claim, 8 Drawing Sheets

WIRE ROPE TERMINATION

BACKGROUND

1. Field of Invention

This invention relates to wire rope terminations, more specifically to method and means for terminating a stranded wire rope or cable, installable through clearance holes of the threaded body diameter, that is swaged onto wire ropes out in the field.

2. Discussion of Prior Art

Terminations are used at the ends of wire rope and cable to securely connect the cable to an end fitting of some kind. Various forms of wire rope terminations are currently used successfully such as guy wire ends associated with electric power pole guying, and post tensioning concrete. Other forms of wire rope terminations are used in a variety of applications such as to support elevators, move aircraft control flaps, etc.

Many different fittings for the wire rope terminations are manufactured including open and closed eyes, threaded rods, studs, and forks. Some terminations are swaged onto the ends of wire ropes. However, the terminations joined to the wire rope or cable by swaging have a number of disadvantages:

(a) the wire rope length must be known to swage the terminations at a factory;

(b) they require extremely high pressures to generate the friction forces necessary to hold the cable and terminations together when tension is applied to the joint;

(c) the termination designs are such that the swaged connection requires the large equipment found primarily in factories;

(d) the factory made terminations must be precision made with extacting tolerances of the swage stroke and the wire rope used must be precision made as to its diameter so that the machine does not swage too much and break the die or little and not achieve the proper friction fit for a strong termination. These swaged terminations can be made to have the same outside diameter in the swaged end as the threaded end, but must be factory made.

Other swageless terminations are of the type that use slidable wedges that can be released and reused, but they are limited to applications where their large outside diameter does not interfere with the hole diameter through which they are inserted before being used.

Another invention, U.S. Pat. No. 4,043,690 to Browne on Aug. 23, 1977 incorporates a plastic resin molded into the end of the flared wire within a tapered bore whereupon the resin hardens to form the assembly. The disadvantage of the resin core termination is a large outside diameter limiting its application to where there is a large amount of room through which it must pass to install the unit.

Accordingly, several objects and advantages of my wire rope termination are:

(a) to provide a termination installable in the field when the wire rope length is not known until installation time;

(b) to provide a field swaged termination by a hand operated hydraulic tool or other portable swaging tool;

(c) to eliminate the need for close tolerances of the wire rope diameter, the swage stroke, and accurate hole tolerances on the termination used;

(d) to provide a field swagable wire rope termination having a finished outside diameter that is no greater than the diameter of a threaded end for installing through clearance holes, which must be essentially no greater diameter than the threaded body diameter, yet achieving a strong mechanical connection.

Still further objects and advantages will become apparent from a consideration of the ensuing description and drawings. The features of novelty which characterize the invention will be pointed out with particularity in the claims annexed to and forming a part of this specification.

SUMMARY OF THE INVENTION

Briefly, this invention is a method of terminating wire ropes or cables by swaging in the field with hand tools, where the termination's finished outside diameter in the finished sleeve portion must be no greater than the body diameter. Conventional wire rope usually comprises an inner group of wires and an outer group of wires. Sometimes the inner group of wires is merely a single wire. The wire rope is made of a high tensile strength metal. This termination comprises a sleeve portion of a termination, a plug and an end of a wire rope. The sleeve portion or thimble portion is first drilled longitudinally along its axis to a preferred depth and diameter. Then the remaining sleeve portion, having the maximum cross sectional area allowed for the finished product, is swaged outward to form a larger diameter cavity. This embodiment uses a sleeve made out of 1018 steel but any swagable metal could be substituted. The sleeve portion has a fitting such as a threaded rod on the opposite end of the termination. A plug is first inserted into the end of a wire rope over the inner group of wires or center strand, and under the outer layer of strands. This termination uses a plug made of steel, but any material that is strong, yet will not break when the assembly is swaged can be substituted. The assembled wire rope and plug are inserted into the cavity of the sleeve portion to the full depth of the sleeve portion cavity. Then the total sleeve portion of the termination is swaged inward upon the wire rope and plug until the inner surface of the sleeve portion forms along and about the outer layer of wire rope strands. The swaging inward also forms the outer surface of the plug to the wire rope outer strands' inner surface, and forms the plug's inner surface to the wire rope center strand or inner group of wires. The swaged in sleeve now has a smaller inside diameter at the point where the wire rope exits the sleeve than the inside diameter where the plug is in the sleeve, thereby forming a bottleneck.

When a tensile load is applied to the wire rope, this is communicated to the wires inside the finished termination sleeve. The wire rope outer wires are under compression between the tapered plug and the now inside tapered wall of the sleeve. Under loads, the wire rope outer strands grip the plug sufficiently to shift the plug axially in the sleeve so that the wire rope outer strands become more compressed effectively preventing the removal of the wire rope. It should be noted that the final outside diameter of the finished termination sleeve portion is no greater than the threaded portion of the termination. Representative diameters for this termination would be one half, three quarters and one inch diameter.

In addition, the very same termination can be further strengthened by using a second plug. The two tapered plugs provide two tapered bottlenecks and thereby causing the termination to have greater strength when necessary.

It is important to note also that the installation of this termination onto wire rope ends requires only a hand operated hydraulic tool or other portable swaging machine; consequently the entire procedure can be done in the field.

While the following description contains many specificities, these should not be construed as limitations on the scope of the invention, but rather as an exemplification of one preferred embodiment thereof. Many other variations are possible. Accordingly, the scope of the invention should be determined not by the embodiments illustrated, but by the appended claims and their legal equivalents.

DESCRIPTION OF THE PREFERRED EMBODIMENTS

Figure 1:
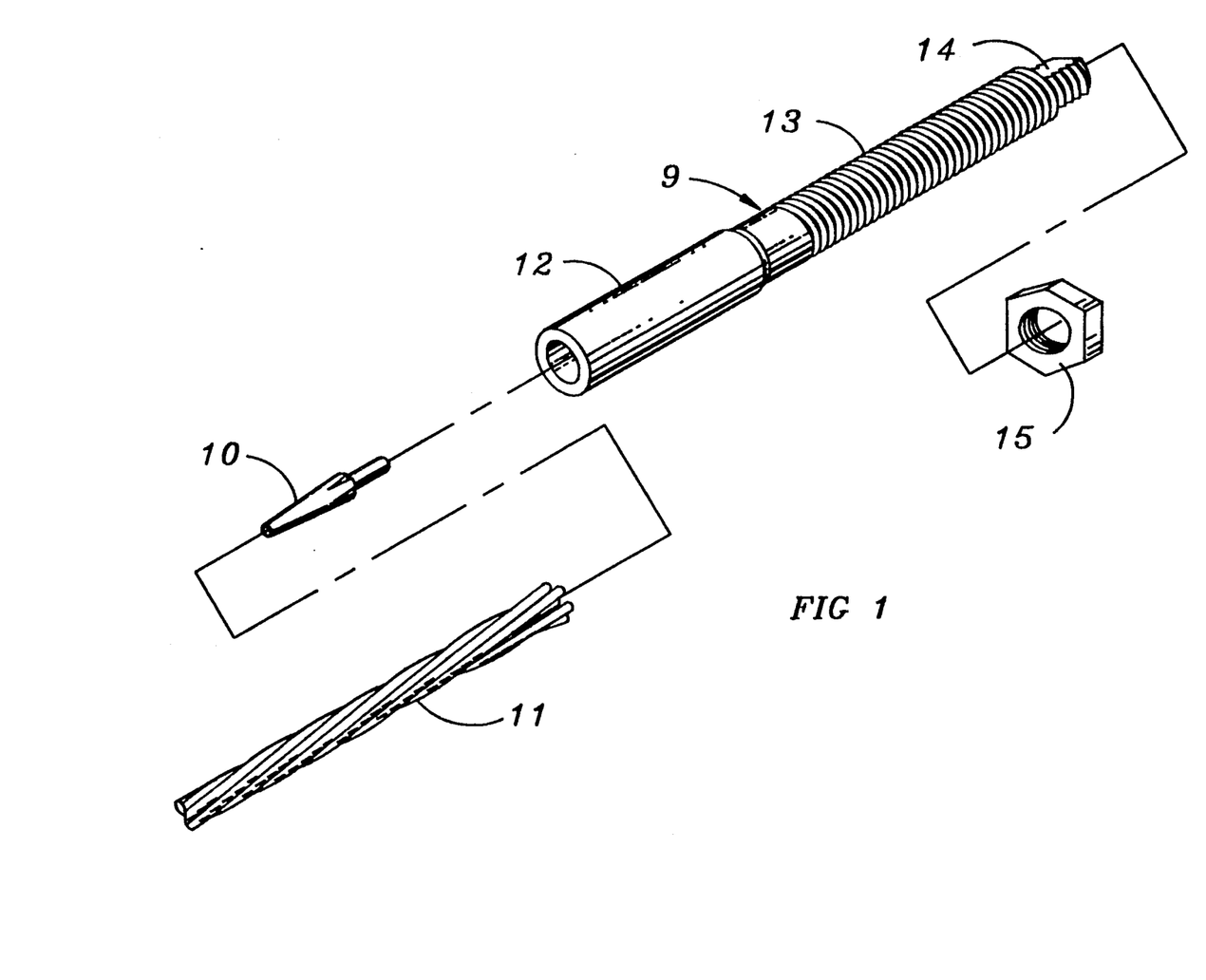
FIG. 1 is an isometric exploded view that is a preferred embodiment of my invention showing a wire rope, plug, sleeve and nut.

There is shown in FIG. 1 a wire rope termination consisting of a termination 9, plug 10, wire rope end 11, and a nut 15. Also shown is the swaged out sleeve portion 12 of termination 9 that receives wire rope end 11 and plug 10. To provide a description of one method for tensioning the wire rope end 11, a wrench flat 14, threaded portion 13 and nut 15 are shown on the end of termination 9 opposing the swaged out sleeve portion 12 end. However, termination 9 could just as well be constructed with an eye, a stud or other type of fitting instead of the threaded portion 13, wrench flat 14 and nut 15. Also it should be understood at this point that the size and shape of termination 9 and plug 10 may be varied depending upon the given application.

The swaged out sleeve portion 12 of termination 9 is swaged outward for several reasons. First the size of the bar stock from which termination 9 is machined will be reduced. Second, the amount of waste material from the machining process is reduced. Both the first and second reasons will reduce the cost of manufacturing. Third, the cross sectional area required for the purpose of strength is retained because the hole is drilled smaller than the required cavity size. Fourth, the swaging outward and then inward partially work hardens the metal increasing the metal's yield strength. Since the wire rope end and plug 10 must fit into the end of termination 9, sleeve portion 12 is swaged outward. This method retains the maximum cross sectional area of metal in the sleeve portion that would be lost if the hole was merely drilled larger.

Figure 2:
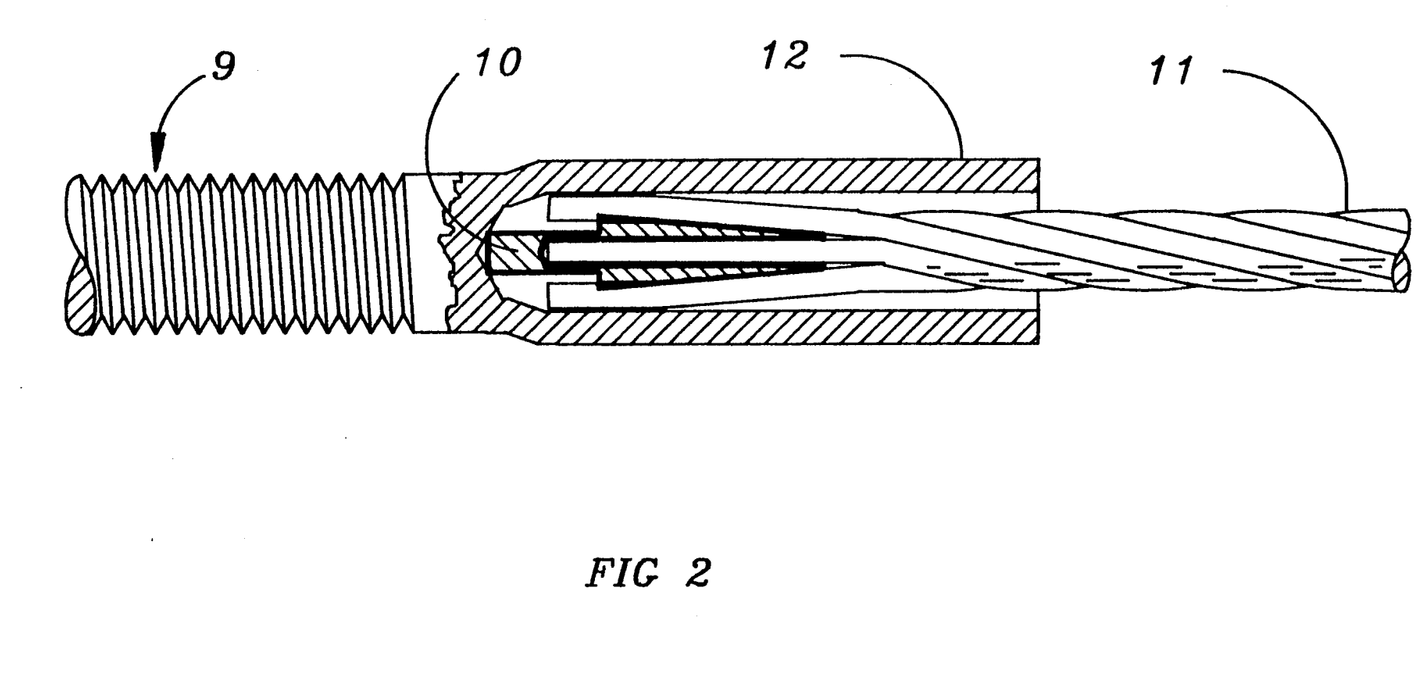
FIG. 2 is a section view of an assembled wire rope or cable termination before swaging inward.

Referring now to FIG. 2, an assembled wire rope termination 9 is shown before swaging inward. The termination 9 is shown with plug 10 inserted into wire rope end 11 over the wire rope center strand and under the wire rope outer strands. The assembled wire rope end 11 and plug 10 is inserted into the swaged out sleeve portion 12 of termination 9.

Figure 3:
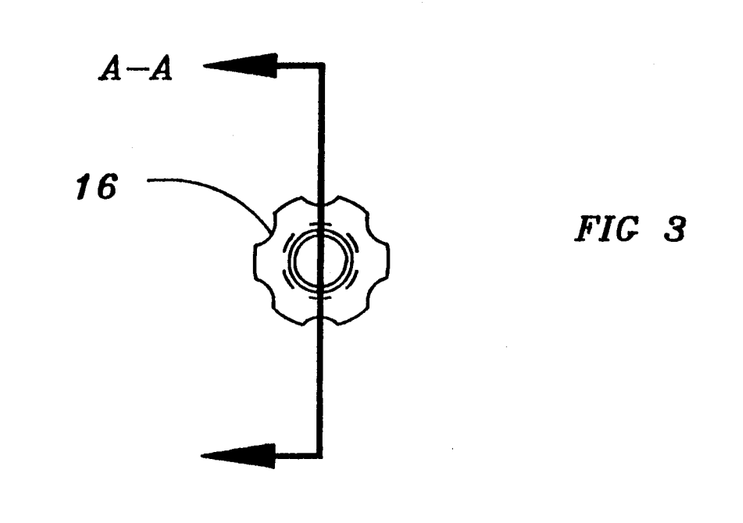
FIG. 3 is an end view of a plug.

Turning now to FIG. 3 there is shown the plug demonstrating the position of grooves 16 for aligning the wire rope outer strands at equal intervals about the plug's circumference.

Figure 4:
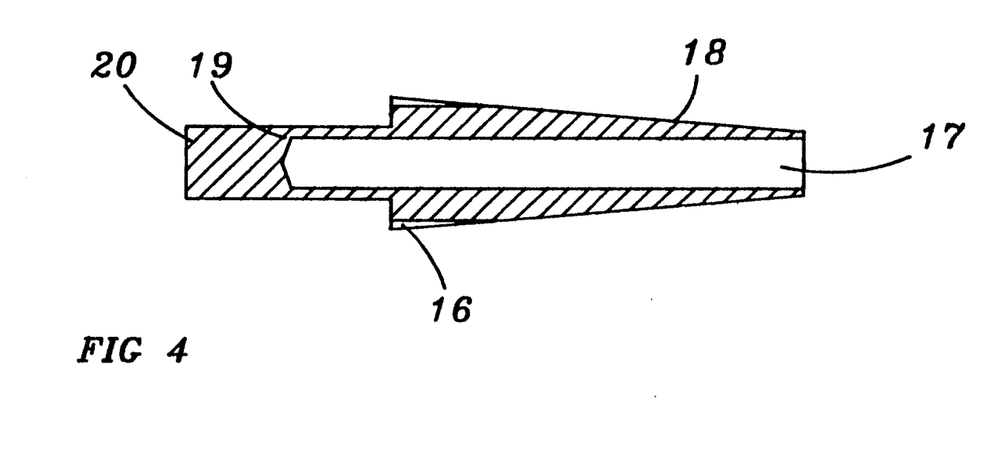
FIG. 4 is a section view of a plug in detail of the portion indicated by the section lines A—A in FIG. 3.

There is shown in FIG. 4 the section view of the plug as indicated by the section lines A—A in FIG. 3. A drilled hole 17, for receiving the wire rope center strand, is shown extending to a preferred depth 19. The preferred depth 19 is to a depth greater than the length of the tapered portion 18 so that the wire rope end 11 outer strands extend beyond the tapered portion 18 being best shown in FIG. 2. Also in FIG. 4 the tapered portion 18 is shown with the grooves 16 located at the largest diameter of the plug on the tapered portion 18 and are parallel to the plug's axis. Grooves 16 are just long enough and deep enough to control the wire rope outer strands positioning them at equal intervals about the plug's circumference. The tapered portion 18 of the plug is shown with approximately a five degree taper. A positioning portion 20 extending beyond hole 17 is shown for correct depth insertion control of the wire rope end into the sleeve. Correct depth insertion is achieved when the center strand of the wire rope end 11 is bottomed out in the hole 17 at the preferred depth 19, and the wire rope end 11 and plug are inserted to the bottom of the swaged out sleeve portion 12.

Figure 5:
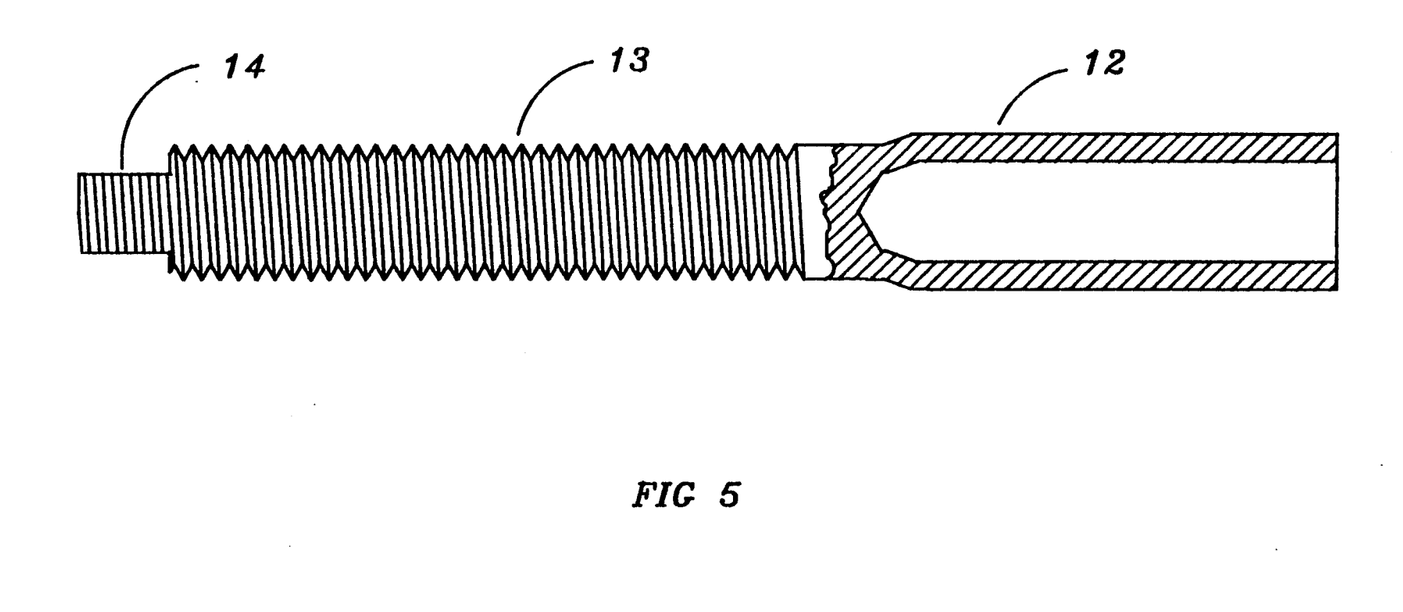
FIG. 5 is a section view of a termination showing a threaded end with wrench flats and, on the opposing end, a longitudinaly drilled sleeve portion that has been swaged outward.

In addition there is shown in FIG. 5 the sleeve made from a swageable metal rod. Swaged out sleeve portion 12 is swaged outward to an inside diameter that will receive the stranded wire rope with the plug 10 installed into the wire rope end 11. The termination 9 has threaded portion 13 to provide a way of tensioning the wire rope. Also shown is wrench flat 14 comprising two parallel surfaces cut on the sides of the threaded rod at its end so a wrench may be used to hold the threaded rod while tensioning the wire rope.

Figure 6:
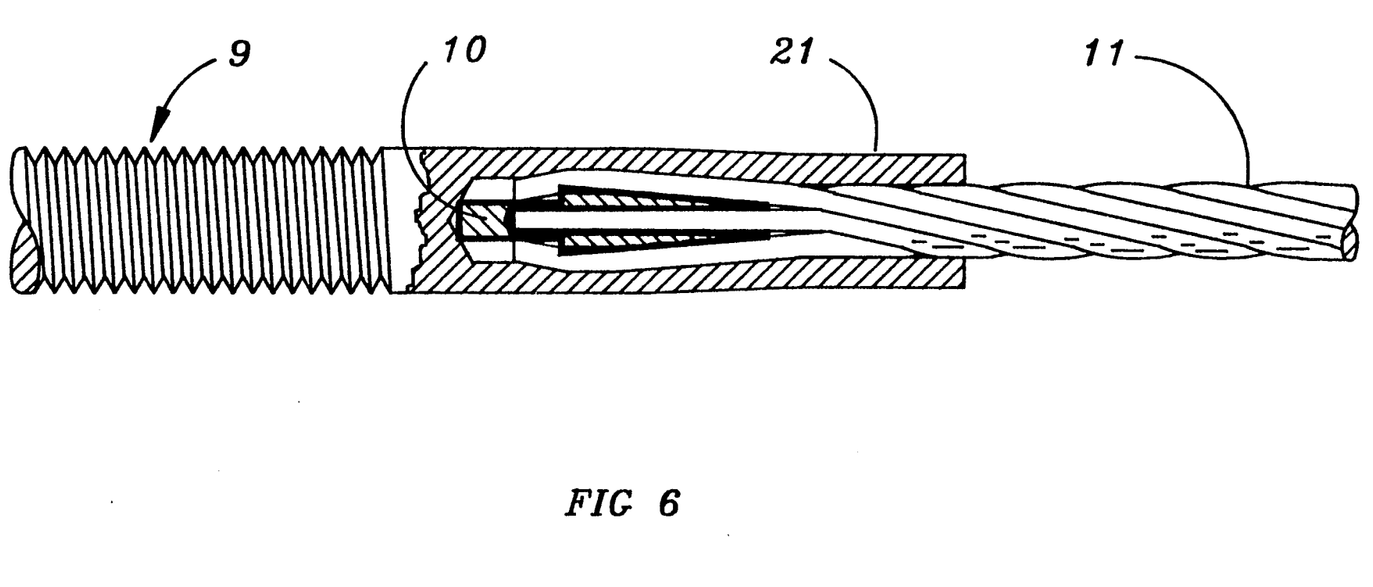
FIG. 6 is a section view of an assembled termination after swaging the sleeve portion down onto the wire rope end with a plug installed.

Relating to the previous figures there is shown in FIG. 6 the assembled wire rope termination that has been swaged inward to complete the installation. Plug 10 is inserted into the end of wire rope end 11 over the center strand. Both plug 10 and wire rope end 11 are inserted into swaged out sleeve portion 12. Swaged in sleeve portion 21 of termination 9, that was swaged out sleeve portion 12 as shown in FIG. 2, is swaged inward to catch plug 10 and wire rope end 11. Thus the inward swaging forms a bottleneck on the end of termination 9 at swaged in sleeve portion 21. Also, the metal in the sleeve portion of the termination is in tight contact with the wire rope. When a tensile load is applied to the wire rope end 11, tension is communicated to the wires inside swaged in sleeve portion 21. Under loads, the wire rope strands grip plug 10 sufficiently to shift plug 10 axially inside swaged in sleeve portion 21 so that plug 10 compresses wire rope end 11 ever more tightly against swaged in sleeve portion 21.

Figure 7:
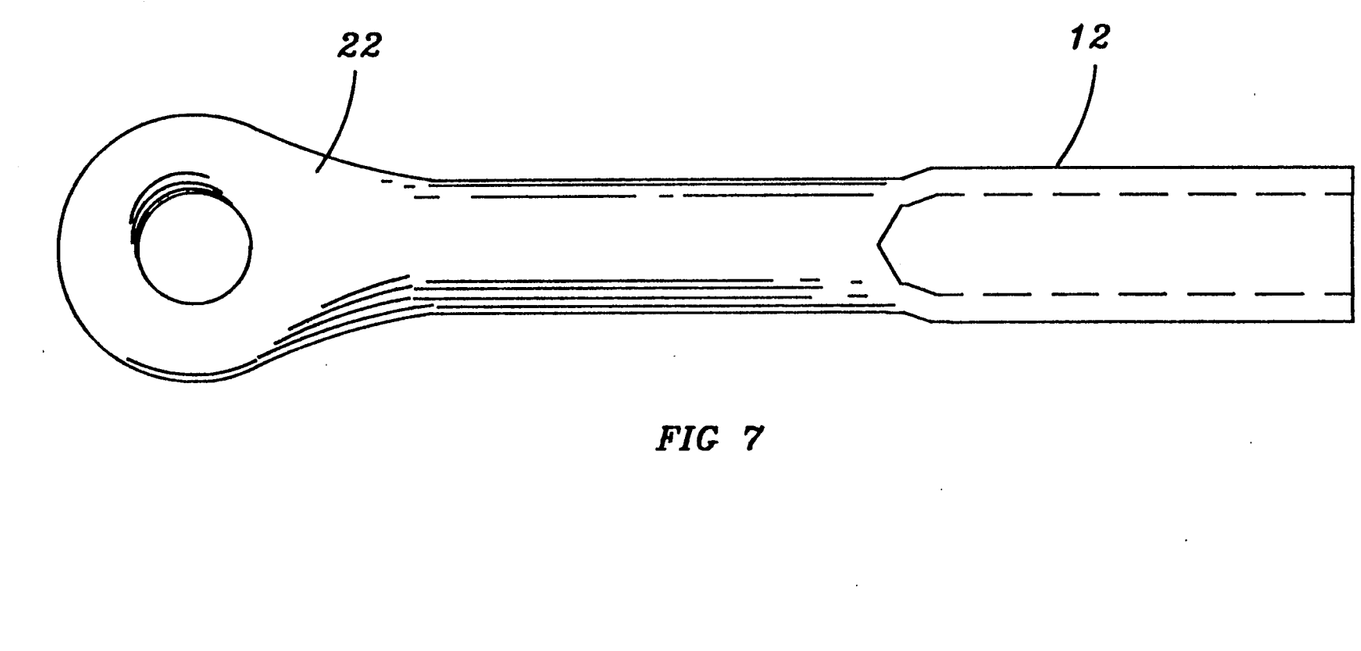
FIG. 7 is side view of an eyelet termination as an example of another embodiment that can be field swaged onto the wire rope end.

Moving on to other embodiments there is shown in FIG. 7 an example of the termination with an eyelet end 22. Also shown is swaged out sleeve portion 12 that has been drilled and swaged outward to an inside diameter that will receive the stranded wire rope with the plug installed in the end.

Figure 8:
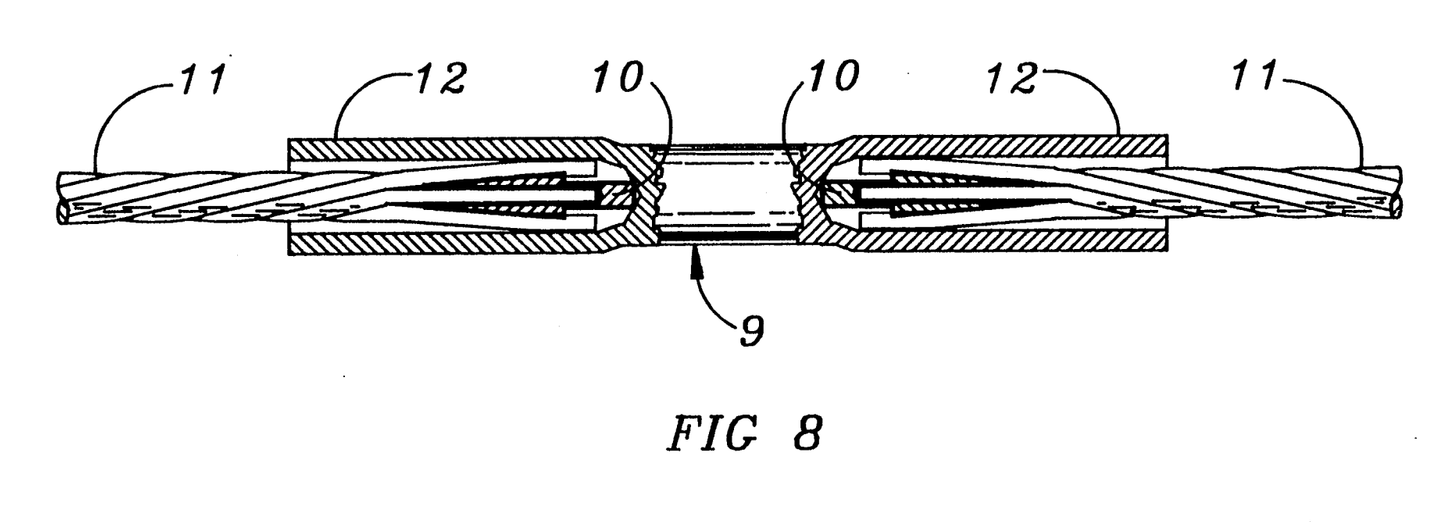
FIG. 8 is a section view of an assembled splice as an example of yet another embodiment that can be field swaged onto the wire rope ends.

In addition FIG. 8 shows this method as applied to a wire rope splice. Wire ropes 11 and plugs 10 can be inserted into a swaged out sleeve portion 12 that has been drilled and swaged out on both ends. Swaged out sleeve portions 12 are swaged inward thus capturing wire rope ends 11.

Figure 9:
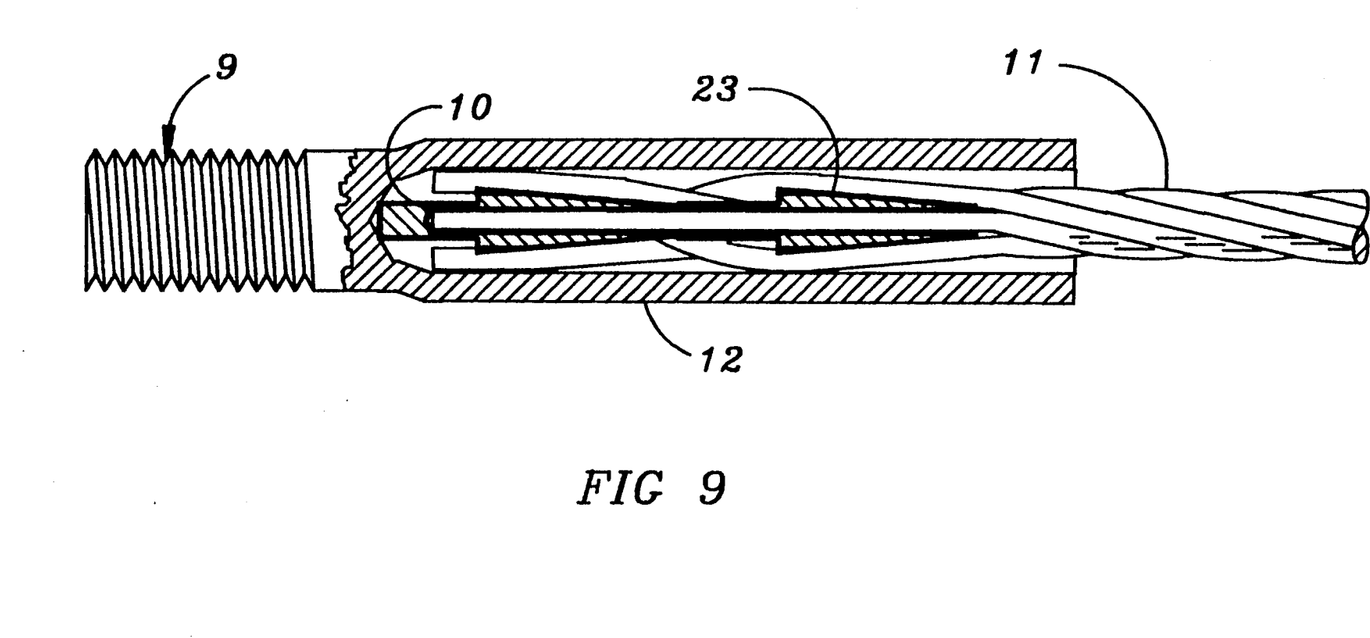
FIG. 9 is a section view of an assembled termination as an example of a method using two tapered plugs.

Finally FIG. 9 shows a similar method including a second tapered plug 23. Second tapered plug 23 is the same plug as tapered plug 10 except hole 17 is drilled completely through plug 10. Second tapered plug 23 is inserted into the wire rope end before tapered plug 10. Tapered plug 10 is then inserted pushing second tapered plug 23 further into wire rope 11 but still adjacent to tapered plug 10. Both tapered plugs and wire rope end are then inserted into swaged out sleeve portion 12. Then the swaged out sleeve portion 12 is swaged inward to make intimate contact with wire rope end 11.

OPERATION

Wire rope terminations are comprised of a termination 9, plug 10 and stranded wire rope end 11 as shown in FIG. 1. Swaged out sleeve portion 12 of termination 9, shown in FIG. 1 and FIG. 5 in section, is constructed by drilling a hole into one end of the metal rod and swaging outward the remaining sleeve portion. The hole drilled in the end of the termination 9 is too small to fit a cable end with a plug 10 installed, and is now swaged outward. The hole is first made smaller in order to retain the cross sectional area of metal necessary for strength. Swaging outward a smaller diameter metal rod reduces cost by reducing cut off waste. Cost is further reduced because the bar stock size required for the termination is reduced while retaining the cross sectional area necessary for strength. The inside diameter of the swaged out sleeve portion 12 is now large enough to receive the wire rope end 11 with plug 10 installed. The end of termination 9 opposing the swaged out sleeve portion 12 has the threaded portion 13 so that nut 15 may be used to tension the wire rope. Wrench flat 14 is provided so that a wrench will prevent termination 9 from turning axially while tightening nut 15 to tension the wire rope.

Focusing on plug 10 shown in FIG. 4, plug 10 has a drilled hole 17 in one end to fit over a center strand of the wire rope end 11. Plug 10 has a tapered portion 18 tapering from the end with hole 17 to a larger external diameter toward the middle of plug 10. Tapered portion 18 spreads apart the outer strands of wire rope end 11. The larger diameter tapered portion 18 has external logitudinally extending grooves 16 to position the outer strands of wire rope end 11 equally about the circumference of plug 10 as shown in FIG. 3 and FIG. 4. Hole 17 drilled to preferred depth 19 provides the positioning stop for plug 10 when it is inserted into wire rope end 11. The plug's position in wire rope end 11 is such that the wire rope outer strands extend beyond tapered portion 18. Beyond tapered portion 18, plug 10 is a smaller diameter allowing the outer strands of wire rope end 11 to be bent inwardly over plug 10 during the inward swaging of swaged out sleeve portion 12. The outer strands being bent over plug 10 will help hold wire rope end 11 when tension is applied, and will grip plug 10 sufficiently to shift the plug axially inside swaged in sleeve portion 21. Positioning portion 20 of plug 10 stops plug 10 and wire rope end 11 at the proper depth inside swaged out sleeve portion 21. Plug 10 and wire rope end 11 must be positioned nearly the same place in each assembly so that the swaging die will taper swaged in sleeve portion 21 at tapered portion 18 of plug 10. The swaging die will be positioned according to the end of termination 9. After swaging inward with a hand swaging tool, the internal taper of swaged in sleeve portion 21 and external taper of plug 10 approximately match, and the outer strands of wire rope end 11 will be caught and held between swaged in sleeve portion 21 and plug 10. The swaging in pressure partially collapses plug 10 down onto wire rope end 11 center strand, thereby gripping wire rope end 11 center strand.

Correct alignment of wire rope end 11, plug 10 and termination 9 is shown in FIG. 2. Plug 10 is inserted into wire rope end 11 until the center strand bottoms out inside hole 17 of plug 10. Plug 10 and wire rope end 11 are inserted into swaged out sleeve portion 12 of termination 9 until plug 10 bottoms out in the hole of termination 9. Thus a repeatable correct alignment is obtained.

As shown in FIG. 6 the swaged wire rope termination is complete. Swaged out sleeve portion 12 of FIG. 2 is now swaged in becoming swaged in sleeve portion 21 of FIG. 6. The swaging flows the metal of swaged in sleeve portion 21 into the space between the outer strands of wire rope end 11 at the largest diameter of plug 10. The amount of metal that flows tapers with less flowing of metal in between the wire rope strands where the wire rope end 11 exits the termination 9. The flowing of the metal keeps the cross sectional area while reducing the outside diameter. The swaging in also bends the ends of the wire outer strands over plug 10 so that wire rope end 11 grips plug 10. Swaged in sleeve portion 21 now has an inside taper resembling a bottle neck, having a smaller inside diameter where the wire rope end 11 exits, and will hold under compression the outer strands of wire rope end 11 against plug 10. Since plug 10 is caught with wire rope end 11, the outer strands are compressed against plug 10 sleeve 12 which lodges wire rope end 11 firmly to hold against tension. In addition, swaged out sleeve portion 12 is further strengthened due to the work hardening of the metal selected for termination 9.

Threaded portion 13 of termination 9, as shown in FIG. 1, allows nut 15 to be used to tension wire rope end 11. Nut 15 must be used in a manner such that nut 15 turns against a structure member and exerts a force along the axis of termination 9 in the opposite direction of the wire rope.

Other embodiments are possible such as an eyelet end 22, shown in FIG. 7, a splice as shown in FIG. 8, and a termination using two tapered plugs as shown in FIG. 9. Although only one embodiment of the invention has been described and illustrated, along with three more embodiments illustrated, it will be apparent to those skilled in the art that various changes and modifications may be made therein without departing from the spirit of the invention or from the scope of the appended claims.

I claim:

1. A method of forming a wire rope termination assembly suitable for joining a wire rope to a tensioning member, the steps of:
    providing a wire rope composed of a multiplicity of wire strands comprising an inner wire core and an outer group of wires wound helically about the inner core, providing a metallic termination rod having an end portion with a configuration suitable for connection to a fitting and another end portion adapted to be formed as a sleeve;

(1) drilling a blind bore from one end of the rod into said another end portion a selected depth and with a diameter which is less than the largest transverse dimension in a radial plane of the multiplicity of wire strands which compose said wire rope, thereby creating a sleeve having a closed end;

(2) swaging the sleeve in a radially outward direction, thereby enlarging the inner the diameter of the sleeve to a diameter which is greater than the largest transverse dimension in any radial plane of the multiplicity of wire strands which compose said wire rope;

providing a tapered plug with a tapered section having a frusto-conical surface defined about axis representing the longitudinal axis of the plug and with the small diameter end of the tapered section representing one end of the plug and the large diameter end of the tapered section defining a radially extending annular shoulder, said plug having a positioning portion extending coaxially of the plug from said shoulder to the other end of the plug and said plug further having a central blind bore extending from the small diameter end of the tapered section of the plug in coaxial relation therewith and to a depth therein which exceeds the length of said tapered section;

inserting said plug into the wire rope at one end of said rope with the inner wire core received in the central blind bore of the plug and the outer group of wires extending over the tapered section of the plug beyond said shoulder and short of said other end of the plug, sleeving said sleeve over said one end of the wire rope with the positioning portion of the plug bottoming on the closed end, and then swaging the sleeve in an inward direction, thereby collapsing the sleeve onto said outer group of wires and said plug and also collapsing said plug inwardly upon said inner wire core, thereby forming a bottleneck in the sleeve, whereby said plug is adapted to shift axially within the sleeve and retained by said bottle neck whenever a tensile force is applied to the wire rope.

* * * * *